United States Patent [19]

Kitsuki

[11] Patent Number: 5,371,546
[45] Date of Patent: Dec. 6, 1994

[54] LSI ENCODING DEVICE WITH PIXEL DATA BLOCKING AND VERTICAL DECIMATING CIRCUITS

[75] Inventor: Toshiaki Kitsuki, Tokyo, Japan

[73] Assignee: NEC Corporation, Japan

[21] Appl. No.: 237

[22] Filed: Jan. 4, 1993

[30] Foreign Application Priority Data

Feb. 28, 1992 [JP] Japan .................. 4-042596

[51] Int. Cl.⁵ ............................................ H04N 11/02
[52] U.S. Cl. .................................... 348/420; 348/403; 358/433
[58] Field of Search ................. 358/13, 133, 160, 138, 358/433; 348/420, 403–408; H04N 7/13, 11/04, 11/02

[56] References Cited

U.S. PATENT DOCUMENTS

| | | | |
|---|---|---|---|
| 4,764,805 | 8/1988 | Rabbani et al. | 358/13 |
| 4,829,378 | 5/1989 | LeGall | 358/160 |
| 4,916,537 | 4/1990 | Nakayama et al. | 358/133 |
| 5,105,271 | 4/1992 | Niihara | 358/133 |
| 5,136,379 | 8/1992 | Ishii | 358/138 |

FOREIGN PATENT DOCUMENTS

| | | |
|---|---|---|
| 2000292 | 4/1990 | Canada . |
| 0329976 | 8/1989 | European Pat. Off. . |
| 0260992 | 10/1989 | Japan . |
| 0261989 | 10/1989 | Japan . |
| 9006038 | 5/1990 | WIPO . |

*Primary Examiner*—Mark R. Powell
*Assistant Examiner*—John W. Miller
*Attorney, Agent, or Firm*—Laff, Whitesel, COnte & Saret

[57] ABSTRACT

An LSI device for encoding an image includes a dot sequential access unit for sequentially storing in an external storage image data arranged in a dot sequential manner, a block data output device for outputting block data from the storage, the block data including the pixel data of a predetermined number of lines and a predetermined number of columns, and a vertical decimating unit for conducting a vertical decimating operation for the block data. The LSI device employs only one memory to achieve the decimating operation and the blocking operation. As a result, the number of pins of the device and the size thereof can be decreased.

3 Claims, 4 Drawing Sheets

16 PIXELS

16 PIXELS

8 PIXELS

16 PIXELS

# LSI ENCODING DEVICE WITH PIXEL DATA BLOCKING AND VERTICAL DECIMATING CIRCUITS

BACKGROUND OF THE INVENTION

The present invention relates to a large scale integrated (LSI) device for encoding an image, and in particular, to an LSI device for encoding an image for use with color television signals in which signals are decimated in a preprocessing of the encoding.

DESCRIPTION OF THE PRIOR ART

When encoding an image, signals representing the image are decimated in a preprocessing; moreover, there is conducted a blocking operation in a pixel block unit. Each block unit includes, for example, 8 by 8 pixels.

In a conventional LSI device for encoding an image, the decimating and blocking operations are executed by use of different memories respectively assigned thereto.

FIG. 1 shows an example of the conventional LSI device, which includes a decimating section 70 and a blocking section 80.

The decimating section 70 is constituted with a horizontal decimating section 40 and a vertical decimating section 60.

The horizontal decimating section 40 includes a delay circuit 41 for delaying an input signal thereto by a period of time equivalent to a pixel, an adder 42 for calculating a mean value of the input signal and the signal thus delayed by one pixel, and a switch 43 for conducting a change-over operation between the input signal and a horizontal mean signal. The vertical decimating section 60 includes a delay circuit 61 for delaying an input signal thereto by a period of time related to a line, an adder 62 for calculating a mean value of the input signal and the signal thus delayed by one line, and a switch 63 for accomplishing a change-over operation between the input signal and a vertical mean signal. In this configuration, the delay circuit 61 requires a large memory capacity and hence is arranged at a position external with respect to the LSI chip.

In addition, the blocking section 80 includes a dot sequential access section 81, a pixel memory 82, and a block sequential access section 83. The pixel memory 82 also requires a large memory capacity and hence is arranged at an external position.

Description will now be given of the operation of the conventional LSI device.

First, in the horizontal decimating section 40, when an input signal [thereto contains data of luminance signals, the switch 43 is set to a side a so as to directly output the data therefrom. On the other hand, when the input signal I contains chrominance signals, the switch 43 is set to a side b so as to generate a mean value in the unit of two pixels, thereby outputting therefrom the mean value as a horizontal mean signal. In the computation of the horizontal mean signal, the input chrominance signal is added by the adder 42 to a color difference signal previous thereto in the horizontal direction, the chrominance signal being delayed by the delay circuit 41 by one pixel. The total of these signals is then shifted by one bit to produce the horizontal mean signal.

Subsequently, in the vertical decimating section 60, when an input signal H thereto contains data of luminance signals, the switch 63 is set to a side a so as to directly output the data therefrom. On the other hand, when the input signal I contains chrominance signals, the switch 63 is set to a side b so as to generate a mean value in the unit of two pixels, thereby outputting therefrom the mean value as a horizontal mean signal. In the computation of the vertical mean signal, the input chrominance signal is added by the adder 62 to a chrominance signal previous thereto in the vertical direction, the chrominance signal being delayed by the delay circuit 61 by one line. The total of these signals is then shifted by one bit to produce the vertical mean signal.

As above, the primary difference between the vertical and horizontal decimating operations is as follows. Namely, when compared with the delay circuit 41 for the delay of one pixel, the one-line delay circuit 63 requires a larger memory capacity. In consequence, the delay circuit 61 cannot be integrally arranged in the LSI device and hence an external memory is required to be connected thereto for the delay circuit 61 as described above.

Next, in the blocking section 80, pixel data P supplied thereto in a line sequential manner is inputted to the dot sequential access section 81. In this section 81, the pixel data P thus received in the line sequential fashion is sequentially written in the pixel memory 82. Moreover, the block sequential access section 83 reads blocks each including pixel data items associated with 8 columns by 8 lines from the pixel memory 82 to produce output data 0 in the block unit including pixel data of 8 columns by 8 lines, i.e., 64 pixel data items. The pixel memory 82 for the blocking operation is of a large capacity and hence cannot be integrally arranged in the LSI chip. Namely, the memory 82 is required to be externally disposed as above.

In this connection, the number of pins or terminals necessary for the one-line delay memory is determined as follows. Assuming the number of pixels per line to be 4096, when there is employed a general-purpose memory, there are required 22 pins in total, namely, 12 pins for addresses, eight pins for data, a pin for a read enable signal, and a pin for a write enable signal. Furthermore, when a first-in first-out (FIFO) memory is adopted, there are required 18 pins in total, namely, eight pins for input data, eight pins for output data, a pin for a timing pulse signal, and a pin for a read/write signal.

Incidentally, the output data 0 is processed by a discrete cosine transformation circuit, a linear quantization circuit, a Huffman encoding circuit, or the like, which are not directly related to the present invention and hence is not shown, so as to be encoded and compressed.

The conventional LSI device for encoding an image necessitates two external memories respectively for the pixel decimating operation and the blocking operation and there are required many terminals for connecting input and output signals and other signals to and from these memories. Namely, the size of the LSI device cannot be easily minimized due to the physical difficulties.

SUMMARY OF THE INVENTION

It is therefore an object of the present invention to provide an LSI device for encoding an image in which the number of terminals for connecting signals to and from memories can be reduced and the size of the LSI device can be minimized.

In accordance with the present invention, there is provided an LSI device for encoding an image including dot sequential access means for sequentially storing in external storing means image data arranged in a dot sequential manner. block data output means for sequentially outputting block data from the storing means, the block data arranged in a block unit including the pixel data of a predetermined number of lines and a predetermined number of columns, and vertical decimating means for conducting a vertical decimating operation for the block data.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
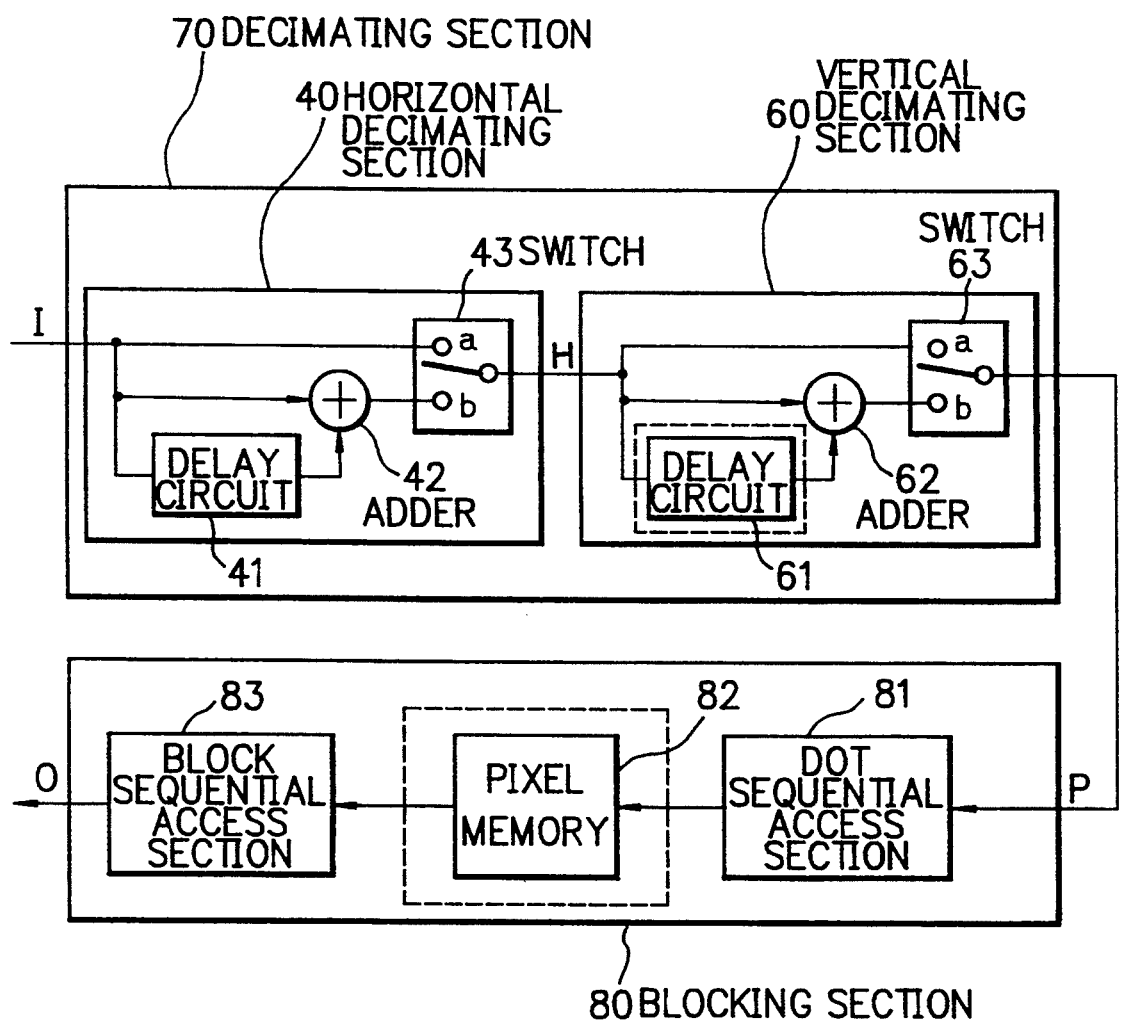
FIG. 1 is a block diagram showing the configuration of an example of the conventional LSI device for encoding an image.

Referring now to the drawings, description will be given of an embodiment according to the present invention.

Figure 2:
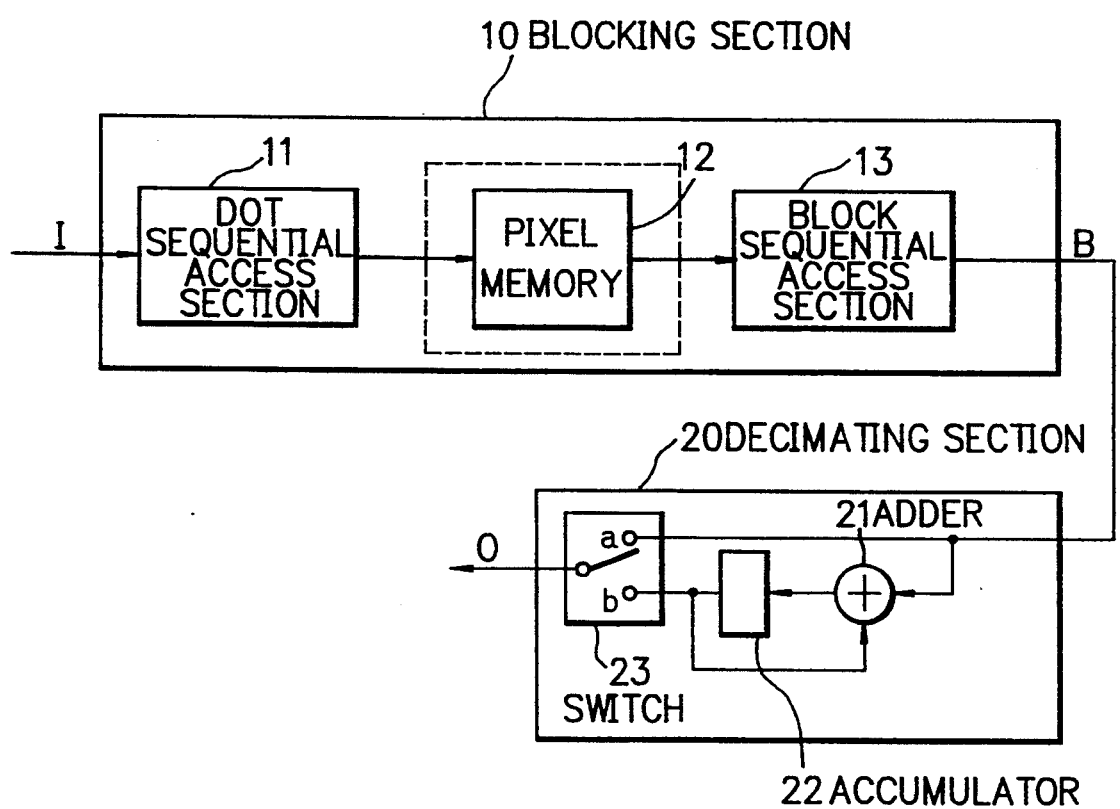
FIG. 2 is a schematic block diagram showing the configuration of a first embodiment of the LSI device for encoding an image in accordance with the present invention.

FIG. 2 shows in a block diagram of a first embodiment of the LSI device for encoding an image in accordance with the present invention.

The LSI includes as shown in this diagram a blocking section 10 and a decimating section 20.

The blocking section 10 is constituted with a dot sequential access section 11, an external pixel memory 12, and a block sequential access section 13.

The decimating section 20 includes an adder 21 for achieving an addition to calculate a mean value of four input signals sequentially supplied thereto, an accumulator 22 for temporarily storing therein a result of the addition, and a switch 23 for achieving a change-over operation between an input signal thereto and a mean signal as an output signal from the accumulator 22.

Next, the operation of the embodiment will be described. First, description will be given of the blocking operation of the blocking section 1.

The dot sequential access section 11 first inputs pixel data I supplied thereto in a line sequential manner and then sequentially writes the data I in the pixel memory 12. Since the data thus stored in the memory 12 has not been decimating out yet, the memory 12 is configured such that each of two chrominance signals is assigned with a memory capacity equal to that of the luminance signal. Next, the block sequential access section 13 accesses the luminance signals in a block sequential manner in substantially the same manner as for the conventional case. In accessing the color signals, the number of pixel data items are increased in association with the decimating ratio. For example, when the decimating ratio of chrominance signals in one half ($\frac{1}{2}$) for each of the row and column and the block size of output signal B is represented as eight pixels/line by eight pixels/column, the access section 13 processes the data in the unit of 16 pixels by 16 pixels.

Figure 4:
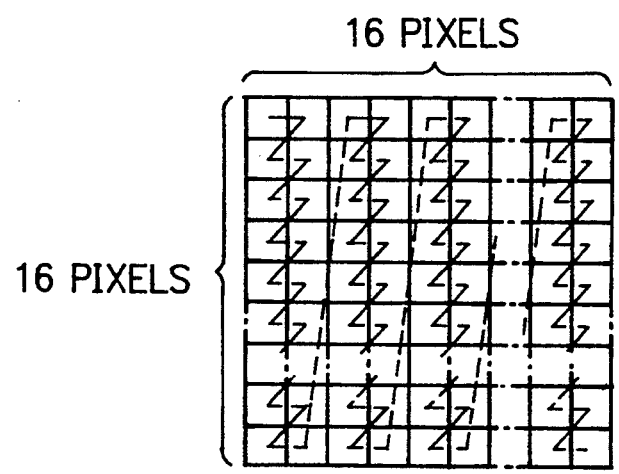
FIGS. 4 and 5 are diagrams showing examples of pixel data arrangement in the LSI device for encoding an image in accordance with the present invention.

FIG. 4 shows a specific example of the operation above. The chrominance signals are read, as indicated by dotted lines in FIG. 4, along the vertical direction in the unit of two pixels in the horizontal direction. The chrominance signals are read in the unit of 16 pixels by 16 pixels, whereas the luminance signals are accessed in the unit of eight pixels by eight pixels.

Next, the decimating operation of the decimating section 2 will be described.

First, when block data of luminance signals is received as an input signal B, the switch 23 is set to a side a to directly output therefrom the block data. When the input signal B contains block data of chrominance signals, the switch 13 is set to a side b such that a mean value is calculated for four data items sequentially acquired from the block data of luminance signals sequentially inputted thereto as indicated by dotted lines in FIG. 4, thereby outputting the mean value. In this computation, four data items are added to each other by the adder 21 to be stored and shifted by two bits in the accumulator 22.

In the operation above, the pixel memory 12 is commonly used for the blocking and decimating operations, which unnecessitates the one-line delay memory conventionally employed. As above, about 20 pins or terminals of the LSI device required for the memory can be accordingly dispensed with.

Subsequently, description will be given of a second embodiment in accordance with the present invention.

Figure 3:
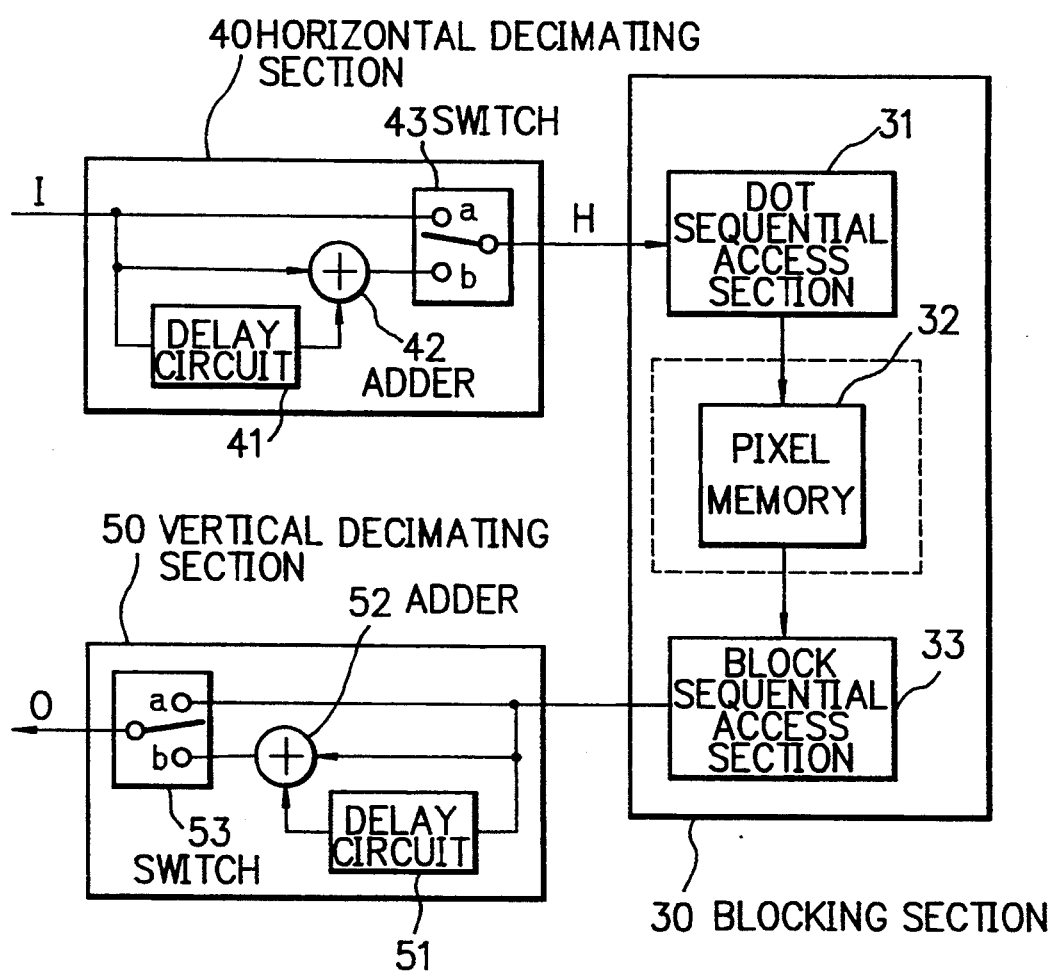
FIG. 3 is a block diagram illustratively showing the configuration of a second embodiment of the LSI device for encoding an image in accordance with the present invention.

FIG. 3 shows in a block diagram a second embodiment of the LSI device according to the present invention.

The difference between the first and second embodiments resides in that a horizontal decimating section 40 and a vertical decimating section 50 are adopted in the second embodiment in place of the decimating section 20 of the first embodiment.

The horizontal decimating section 40 is substantially identical to the horizontal decimating section 40 of the decimating section 70 in the conventional example of FIG. 1 and includes a delay circuit 41, an adder 42, and a switch 43.

Included in the constitution is a blocking section 30 constituted with a dot sequential access section 81, a pixel memory 82, and a block sequential access section 88. The vertical decimating section 50 is constituted in substantially the same way as for the horizontal decimating section 40 and includes a delay circuit 51, an adder 52, and a switch 53.

The operation of the second embodiment will now be described.

The operation of the horizontal decimating section 40 is substantially identical to that of the conventional example and hence duplicated description thereof will be avoided.

Next, the dot sequential access section 31 of the blocking section 30 receives pixel data H outputted from the horizontal decimating section 40 to sequentially store the data H in the pixel memory 32. The data thus stored has been horizontally decimated out. However, the vertical decimating operation has not been carried out for the data. In consequence, a comparison is made between the luminance signal and each of the two chrominance signals, thereby configuring the memory with a memory capacity reduced by an amount associated with the horizontal decimating ratio. The block sequential access section 33 accesses the luminance signals, like in the case of the conventional system, in the block sequential manner. In accessing the chrominance signals, the number of pixel data items to be accessed is increased in accordance with the decimating ratio in substantially the same way as for the first embodiment. For example, in a case where the decimating ratio of color difference signals is one half (½) for each the column (along the vertical direction) and the block size of the output signal B is represented as eight pixels/line by eight pixels/row, the block sequential access section 33 processes the chrominance signals in the unit of eight pixels/line (horizontal direction) by 16 pixels/column.

Figure 5:
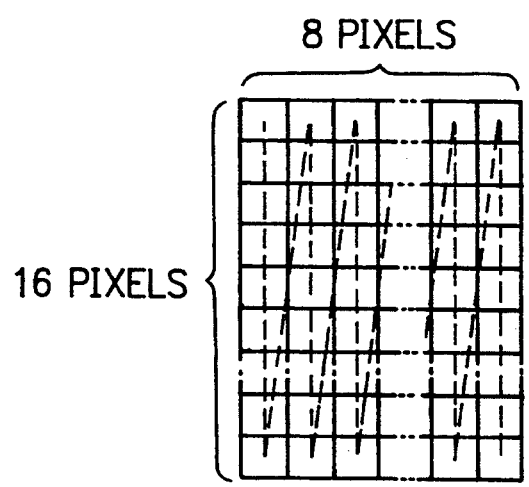

FIG. 5 shows a concrete example of the operation. The chrominance signals are read along the vertical direction in the unit of eight pixels/line (horizontal direction) by 16 pixels/row. The luminance signals are read in the unit of eight pixels/line by eight pixels/row.

Next, when the input signal B contains block data of luminance signals, the switch 53 is set to a side a such that the vertical decimating section 50 directly outputs the block data therefrom. When the received signal B contains block data of chrominance signals, the switch 53 is set to a side b to calculate a mean value in the unit of two pixels, thereby outputting the obtained mean value as a vertical mean signal. As indicated by dotted lines in FIG. 5, the color difference signals are inputted along the vertical direction. Consequently, the vertical mean signal is obtained, like in the case of the horizontal decimating section 40, by computing a mean value in the unit of two data items sequentially inputted thereto.

As compared with the first embodiment, the second embodiment can minimize the capacity of the pixel memory; moreover, the number of accesses to the pixel memory is decreased. This consequently leads to an advantage that the processing speed is increased.

Description has been given of the LSI device in accordance with the present invention. In the image encoding process, a configuration similar to the constitution described above can also applied to the de-blocking operation to re-arrange block sequential pixel data into dot sequential pixel data and to the interpolation of pixel data. With this provision, the pixel memory and the one-line delay memory conventionally disposed as separate memories can be replaced with an image memory. In this case, the interpolation section and the deblocking section respectively correspond to the interpolation section and the blocking section of the embodiment and the pixel data flows in the reverse direction.

As above, the LSI device for encoding an image in accordance with the present invention includes a dot sequential access unit for sequentially storing in an external storage image data arranged in a dot sequential manner, a block data output device for sequentially outputting block data from the storage, the block data including the pixel data of a predetermined number of lines and a predetermined number of columns, and a vertical decimating unit for conducting a vertical decimating operation for the block data. With this provision, the vertical decimating operation is conducted for pixel data arranged in a block sequential manner. Consequently, the one-line delay memory and the pixel memory can be implemented by one memory. This decreases the number of pins for connections of signals to and from the memory and hence leads to an advantageous effect that the size of the device can be minimized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pixel data blocking and decimating circuit comprising:
    dot sequential access means for sequentially storing in one external storing means image data arranged in a dot sequential manner;
    block data output means for sequentially outputting block data from the external storing means, the block data being arranged in a block unit including the pixel data of a predetermined number of lines and a predetermined number of columns;
    vertical decimating means for conducting a vertical decimating operation for the block data outputted by the block data output means; and
    vertical scanning means for producing output pixel data, said vertical scanning means being included in the block data output means and scanning in a vertical direction the block data obtained from the storing means and arranged in the block unit.

2. A circuit as claimed in claim 1, further comprising horizontal decimating means for storing data in the external string means by way of the dot sequential access means, the data being decimated in a horizontal direction by the horizontal decimating means.

3. A pixel data blocking and decimating circuit comprising:
    dot sequential access means for sequentially storing image data arranged in a dot sequential manner in one external storing means;
    block data output means for sequentially outputting blocks of data from the external storing means, the block of data being arranged in a block unit including the pixel data of a predetermined number of lines and a predetermined number of columns;
    horizontal decimating means for achieving a decimating operation in a horizontal direction for block data outputted by the block data output means and vertically scanned in the unit of two pixels;
    vertical decimating means for conducting a vertical decimating operation for the block data outputted by the block data output means; and
    vertical scanning means included in the block data output means for scanning the block data obtained from the storing means arranged in the block unit, the scanning in a vertical direction by horizontally scanning the block data in the unit of two pixels, said vertical scanning means producing output pixel data.

* * * * *